US008863290B2

(12) United States Patent
Perroud et al.

(10) Patent No.: US 8,863,290 B2
(45) Date of Patent: Oct. 14, 2014

(54) METHODS AND DEVICES FOR IMPROVING THE RELIABILITY OF COMMUNICATION BETWEEN AN AIRCRAFT AND A REMOTE SYSTEM

(75) Inventors: Marc Perroud, Saint-Genies Bellevue (FR); Michel Bovet, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 1377 days.

(21) Appl. No.: 12/355,388

(22) Filed: Jan. 16, 2009

(65) Prior Publication Data

US 2009/0187976 A1 Jul. 23, 2009

(30) Foreign Application Priority Data

Jan. 23, 2008 (FR) ...................................... 08 50422

(51) Int. Cl.
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |
| G06F 21/57 | (2013.01) |
| H04B 7/185 | (2006.01) |

(52) U.S. Cl.
CPC ............ *H04L 63/1416* (2013.01); *G06F 21/57* (2013.01); *H04B 7/18506* (2013.01); *H04L 63/126* (2013.01)
USPC .............................. 726/25; 717/178; 709/227

(58) Field of Classification Search
None
See application file for complete search history.

(56) References Cited

U.S. PATENT DOCUMENTS

| 7,003,662 | B2* | 2/2006 | Genty et al. .................. 713/158 |
| 7,584,351 | B2* | 9/2009 | Kakii ............................ 713/157 |
| 7,673,334 | B2* | 3/2010 | Takemori et al. ............... 726/10 |
| 2004/0109459 | A1* | 6/2004 | Madour et al. ................ 370/401 |
| 2005/0251854 | A1 | 11/2005 | Shay |
| 2006/0064459 | A1* | 3/2006 | Matsushima ................ 709/203 |

FOREIGN PATENT DOCUMENTS

| FR | 2819964 | 7/2002 |
| WO | WO 2004/047405 A2 | 6/2004 |
| WO | WO 2004/114048 A2 | 12/2004 |
| WO | WO 2007/110509 A1 | 10/2007 |

OTHER PUBLICATIONS

Richard Robinson, et al., "Electronic Distribution of Airplane Software and the Impact of Information Security on Airplane Safety", Computer Safety, Reliability, and Security, XP019071851, vol. 4680, Sep. 18, 2007, pp. 28-39.

\* cited by examiner

*Primary Examiner* — Nadia Khoshnoodi
(74) *Attorney, Agent, or Firm* — Oblon, Spivak, McClelland, Maier & Neustadt, L.L.P.

(57) ABSTRACT

Methods and devices for improving the reliability of communication between an aircraft and a remote system. The aircraft transmits a request for verification of security to a remote system. Upon reception of the response to this request, which includes at least one indication pertaining to the security of the remote system, the aircraft analyzes this indication and decides to establish or not to establish data communication between the aircraft and the remote system. When a verification request is received, the remote system is verified and a response to the request is transmitted to the aircraft.

16 Claims, 6 Drawing Sheets

METHODS AND DEVICES FOR IMPROVING THE RELIABILITY OF COMMUNICATION BETWEEN AN AIRCRAFT AND A REMOTE SYSTEM

TECHNICAL FIELD OF THE INVENTION

The present invention relates to the communication of data between and aircraft and a remote system, such as a ground system or another aircraft. More particularly, the present invention relates to methods and devices for improving the reliability of communication between an aircraft and a remote system, especially permitting the aircraft to be certain that the remote system is secure before exchanging data.

PRIOR ART

The new generations of airplanes, such as the Airbus A380, A350 and A400M (Airbus, A380, A350 and A400M are trademarks), make it possible to exchange data specific to the airplane, especially with ground systems. These data concern, for example, airplane parameters transmitted from the airplane to a ground system to facilitate maintenance operations on the ground. These data may also concern indications or instructions received by an airplane from a ground system and pertaining, for example, to flight parameters, such as the trajectory that the airplane must follow.

Such data are exchanged between the airplane and one or more ground systems. The ground systems may be managed in particular by the airline companies, the airplane manufacturer and/or maintenance companies.

In order to improve and secure data exchange between airplanes and/or between an airplane and a ground system, the data being exchanged are generally compressed and encrypted. Thus, Patent Application WO 2007/110509 discloses data-processing methods and devices for emitting and receiving these data between an airplane and a ground system.

However, although such methods and devices make it possible to secure the transmission of data between an airplane and a ground system, they are unable to take into account the potential vulnerability of the device communicating with the airplane. Thus an airplane communicating with a ground system does not have any guarantee about the security of the remote system. It is therefore possible to envision a hypothesis wherein the ground system, infected by a computer virus or under the control of a computer pirate, would transmit erroneous data to the airplane.

Consequently, the risk exists that downloading of compromised data to the airplane would cause breakdowns or malfunctions of the on-board systems.

The invention makes it possible to solve at least one of the problems mentioned in the foregoing.

OBJECT OF THE INVENTION

The object of the invention is therefore a method for improving the reliability of data communication between an aircraft and a remote system, this method comprising the following steps,
- transmitting a request for verification of the security of the said remote system;
- receiving, in response to the said request, at least one indication pertaining to the security of the said remote system;
- analyzing the said indication; and
- in response to the said analysis, establishing or not establishing the said data communication between the said aircraft and the said remote system.

In this way the method according to the invention permits an aircraft to be certain that the remote system is secure before any communication therewith. The risk that the exchanged data may compromise the integrity of the aircraft is therefore limited.

According to a particular embodiment, the method additionally comprises a step of transmitting an application module capable of analyzing the security of the said remote system. In this way it is possible to increase the reliability of the test of the remote system by directly monitoring the security analysis module.

Another object of the invention is a method for improving the reliability of data communication between an aircraft and a remote system, this method comprising the following steps,
- receiving a request for verification of the security of the said remote system;
- verifying the security of the said remote system; and
- transmitting a response to the said request, the said response comprising at least one indication pertaining to the said verification.

The method according to the invention therefore makes it possible to respond to a request from an aircraft permitting the latter to be certain that the remote system is secure before any communication therewith. The risk that the exchanged data may compromise the integrity of the aircraft is therefore limited.

According to a particular embodiment, the method additionally comprises steps of receiving and installing an application module suitable for analyzing the security of the said remote system. In this way the aircraft is able to monitor directly the security analysis module of the remote system.

Advantageously, the said verification request is transmitted to a third-party system, the said verification step being performed at least partly by the said third-party system. The intervention of a third party in the process of verification of security of the remote system makes it possible to increase the reliability of the response of the remote system, since the third party can be monitored by an authority distinct from that of the remote system.

Advantageously, the said response is at least partly received from the said third-party system, the said part of the said response received from the said third-party system being at least partly encrypted by the said third-party system in order to limit the risks of falsification thereof.

According to a particular embodiment, the said at least one indication represents a level of security of the said remote system. In this way the aircraft is itself capable of evaluating the level of security of the said remote system.

According to another particular embodiment, the said verification request comprises at least one reference to an instruction making it possible to verify at least one element of security of the said remote system. In this way the aircraft is capable of verifying particular security aspects of the remote system.

According to another particular embodiment, the said verification request comprises an indication pertaining to a required level of security of the said remote system, to permit the aircraft to demand a minimal level of security.

Another object of the invention is an aircraft comprising means adapted to perform each of the steps of the method described in the foregoing.

BRIEF DESCRIPTION OF THE DRAWINGS

Other advantages, objectives and characteristics of the present invention will become apparent from the detailed description provided hereinafter by way of non-limitative example, with reference to the attached drawings, wherein:

FIG. 4, comprising

DETAILED DESCRIPTION OF THE INVENTION

Figure 1:
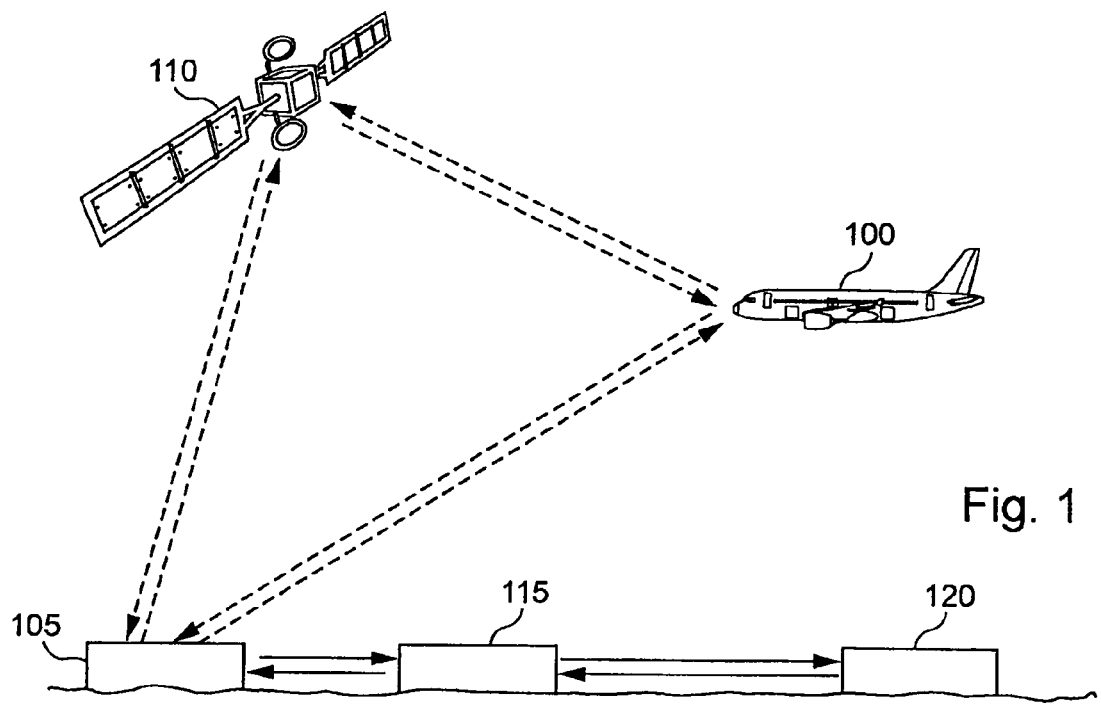
FIG. 1 schematically represents an example of an environment in which the invention may be employed.

FIG. 1 schematically illustrates an example of an environment in which the invention may be employed. As illustrated, an aircraft 100 comprising wireless communication means is able to receive data from a base ground station 105 and to transmit data thereto. The data may be transmitted via satellite communication, in this case via satellite 110, or directly, for example via an HF (initials for high frequency in English terminology) or VHF (initials for very high frequency in English terminology) radio communication.

The link between aircraft 100 and base ground station 105 forms a communication channel, preferably of digital type, known as data link in English terminology. In the present case this communication link is bidirectional.

Base ground station 105 is connected to a ground system 115. It forms a relay capable of transferring data between aircraft 100 and ground system 115, which is preferably independent of the mode of transfer of data between aircraft 100 and base ground station 105. Alternatively, a communication channel may be established directly between aircraft 100 and ground system 115.

It is considered here that a system is a computer system that may consist, for example, of a machine such as a server, a computer or a workstation, or of a plurality of machines connected in a network.

Similarly, depending on needs, a given aircraft may establish a plurality of communication channels with a ground system or with a plurality of ground systems. For example, a first ground system may be linked to a maintenance company, a second to the aircraft manufacturer and a third to the airline company of the aircraft. In this case, the three ground systems may be connected to a single base ground station several. A plurality of communication channels may be used simultaneously.

The establishment of communication channels in this case is achieved in standard manner.

According to a particular embodiment, a system of a trusted third party, referred to as third-party system 120, is connected to ground system 115.

The connections between base ground station 105 and ground system 115 and between third-party system 120 and ground system 115 are advantageously hard-wired or wireless connections, such as Ethernet or WiFi.

If a plurality of ground systems is employed, these may be connected to a single third-party system or to several.

For the sake of clarity, only one ground system and one third-party system are considered here. If a plurality of ground systems and/or a plurality of third-party systems is or are used, it is necessary to use identifiers. The use of such identifiers is well known to those skilled in the art.

Figure 2:
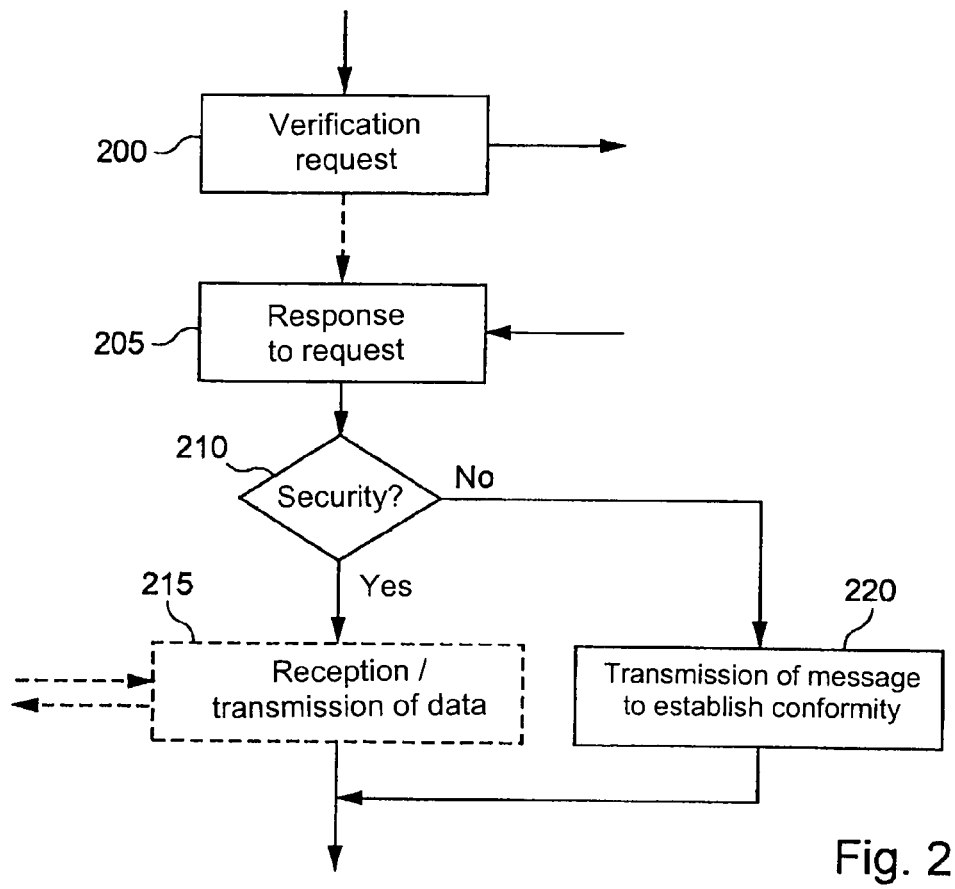
FIG. 2 illustrates some of the steps of an example of an algorithm employing the invention to improve the reliability of communication between an aircraft and a ground system or between two aircraft.

As illustrated in FIG. 2, and in general, aircraft 100 transmits a verification request to ground system 115 (step 200), via base ground station 105, before transmitting data specific to aircraft 100 or receiving data that may compromise the security of aircraft 100. After verification of ground system 115, which may or may not be certified by third-party system 120, ground system 115 responds to the verification request. After having received this response (step 205), aircraft 100 analyzes it to determine if ground system 115 is secure (step 210). If ground system 115 is secure, aircraft 100 is able to receive and/or transmit data (step 215).

If ground system 115 is not secure, aircraft 100 neither transmits data to nor receives data from this system. A message is then preferably transmitted to the ground system, more particularly to the administrator of this system, to demand that the ground system be brought into conformity with the requirements imposed by the aircraft (step 220).

There may exist intermediate situations in which the ground system is partly secure. In this case, certain types of data may be exchanged.

Advantageously, the communications between the aircraft and the ground system are secured during this verification phase. Securing of communications consists, for example, of encrypting the transmitted information items or using an encrypted communication tunnel.

Verification of the ground system is preferably achieved by means of a verification application module, installed in the ground system which can monitor several aspects of the ground system to determine its security status. This verification application module may be installed temporarily in the ground system for the verification time, or installed permanently.

If the application model is installed temporarily, it may in particular be transmitted by the aircraft, for example together with the verification request, or by a separate system, especially by a system of a trusted third party, upon request of the aircraft.

If the application module is installed permanently, it may be monitored regularly by a system of a trusted third party or upon request of the aircraft, in order to verify that this module has not been substituted by another.

The nature of the verifications performed by the application module may be related to the manner in which it is installed.

Thus, regardless of the manner in which it is installed, it is able to verify the following elements:

conformity of the system version;

conformity of the update version of installed software programs;

conformity of the update version of virus definitions in an anti-virus software program;

conformity of the open communication ports and of the associated services (since they could reveal the presence of a secret access, which could be used to access the ground system fraudulently);

presence or absence of predetermined services (for example, Internet-related services such as ssh, web or e-mail);

activation of certain predetermined services (for example, services of the fire-break type, referred to as firewall in English terminology, or of the flow-authorization type); and respect for predetermined rules (for example, the composition and frequency of modification of passwords used).

Other elements, such as the following elements, are advantageously monitored only by permanently installed application modules,

- absence of virus detection during a predetermined period;
- absence of modification of predetermined files (for example, of system files) during a predetermined period;
- pertinence of the access protection (for example, by generic password attempts);
- absence of spillover, also known as overflow in English terminology, of the buffer memory of the system;
- absence of unauthorized installed service;
- absence of authorized connection after numerous attempts; and
- absence of vulnerability (for example, by searching for open communication ports and intrusion attempts via these ports).

Naturally, numerous other elements may be used. For example, the following elements, not necessarily security criteria of the ground system, may be used as confidence indicators or indices,

- absence of intrusion detection by the NIDS (initials for Network Intrusion Detection System in English terminology);
- absence of intrusion detection by the HIDS (initials for Host Intrusion Detection System in English terminology), whether external or integrated into the verification application module; and
- absence of detection of any anomaly relative to normal use of the ground system.

The verification of these elements is preferably achieved in standard manner.

According to a first embodiment, the verification application module comprises a list of all the elements to be verified. Thus, when the verification request is transmitted to the ground system, the response of the ground system is positive if all the elements are verified and negative if at least one element is not verified.

According to a second embodiment, the verification request comprises an indication of elements that must be verified. According to this embodiment, an index may be associated with each element used to verify the security of the ground system. Similarly, an index may be associated with several predetermined elements. Advantageously, a list of indices is stored in memory in the aircraft and in the ground system or in a third-party system. Thus, when the ground system receives the verification request comprising a list of indices, the application module is capable of determining which are the elements that must be verified.

According to a third embodiment, a score is associated with each element. It is also possible to assign a coefficient to each element. Thus the security of the ground system may be gradual. For example, the score associated with the conformity of the update version of virus definitions in an anti-virus software program may vary from 1 to 10 in the following manner: 10 if the version is the most recent, 5 if the version is that preceding the most recent, 2 if the version is less than 15 days old and 0 in all other cases.

The verification result therefore takes the form of a score consisting in the combination, for example a linear combination, of the verification results obtained for each of the verified elements.

The score obtained can be verified by the aircraft, the ground system or a third-party system. In the latter two cases, the score required by the aircraft is preferably transmitted in the verification request.

In addition, the aircraft may require that at least some of the verifications effected be certified by a trusted third party.

In general, therefore, the verification request may take the following form, in which each parameter is optional:

Securitycheck_request(ID_module, list_indices, score, certif)

The parameter ID_module is an identifier of an application module to be used to verify the security of the ground system. This identifier may make reference to a message transmitted by the aircraft and containing this module. It may also be a path in a tree for finding the module on the ground system or in a separate system. Such a path has the form, for example, of address_system/dir1/dir2/module.exe, in which address_system is the address of the system or of the server on which the application module is located, /dir1/dir2/ is the access path to the module from the system root or from the identified server, and module.exe is the name of the application module.

If the parameter ID_module is blank, the application module to be employed is that designated by default in the ground system. If no application module is designated by default in the ground system, the response of the ground system is verification failure, possibly comprising a code indicating the type of failure.

The parameter list_indices is the list of indices of the elements that must be verified. A predetermined character is preferably inserted between each index. If the parameter list_indices is blank, all the elements are preferably verified.

The parameter score stipulates the verification level required by the aircraft. A particular value, such as −1, is advantageously used to demand that the ground system transmit the score obtained during verification, so as to permit the aircraft to determine whether or not the score is sufficient. If the parameter score is blank, all the elements must be verified, the response of the ground system being positive if all the elements are verified and negative if at least one element is not verified.

The parameter certif gives an indication as to the certification of the validation by a trusted third party. This parameter may be, for example, a concatenation of an index representing the identifier of a trusted third party and of a code representing the required level of certification. By way of illustration, such a code may be characteristic of a set of elements to be verified, meaning that the code in the present case corresponds to a list of indices of elements to be verified. If the parameter certif is blank, the verification effected by the ground system is not certified.

The following request illustrates an example of a request that could be used by an aircraft to verify a ground system, Securitycheck_request(9.23.4/system/verif.exe, 1/2/5/22, −1, 5-2/22)

In this example, the application module that must be used by the ground system, named verif.exe, is accessible on the machine having the address 9.23.4 in the system directory. Only the elements 1, 2, 5 and 22 must be verified. The element 22 corresponds, for example, to the elements having the indices 9, 10, 11 and 12. The parameter −1 indicates that the aircraft is demanding that the ground system transmit to it the score obtained by the verification of the elements 1, 2, 5 and 22 by means of the designated application module. Finally, the value 5 of the parameter 5-2/22 indicates that at least part of the verification must be certified by the trusted third party having the identifier 5, while the indication 2/22 stipulates that the verification of the elements having the indices 2, 9, 10, 11 and 12 must be certified.

Advantageously, the response time of the ground system is measured and compared with one or more thresholds. Thus, for example, if the verification of the ground system is positive and the response time is shorter than a first threshold, the aircraft agrees to transmit or receive data. If the verification of the ground system is positive and the response time is longer than the first threshold but shorter than a second threshold, the aircraft agrees to transmit or receive only certain types of data. Finally, if the verification of the ground system is positive and the response time is longer than the second threshold, the aircraft does not agree to transmit or receive any data.

The response transmitted by a ground system to an aircraft following a verification request may take the following form, Securitycheck_response(valid, error_code)

where valid is an indicator, such as a Boolean indicator, that indicates whether the verification is positive (the indicator valid then takes a first value) or whether the verification is negative (the indicator valid then takes a second value). The variable error_code is an error code used if the verification of the ground system has encountered a problem, in order to provide the aircraft with an indication of the nature of this problem.

Alternatively, the response transmitted by a ground system to an aircraft following a verification request may take the following form, Securitycheck_response(score, error_code)

where score corresponds to the result of the verification, or in other words, for example, to the weighted sum of the results obtained by each of the verified elements.

If the result of the verification must be certified, the parameter transmitted to the aircraft (valid or score) is preferably encrypted, decryption making it possible to authenticate the trusted third party and in this way to recognize the certification. Encryption/decryption may be performed by means of standard key algorithms.

Figure 3:
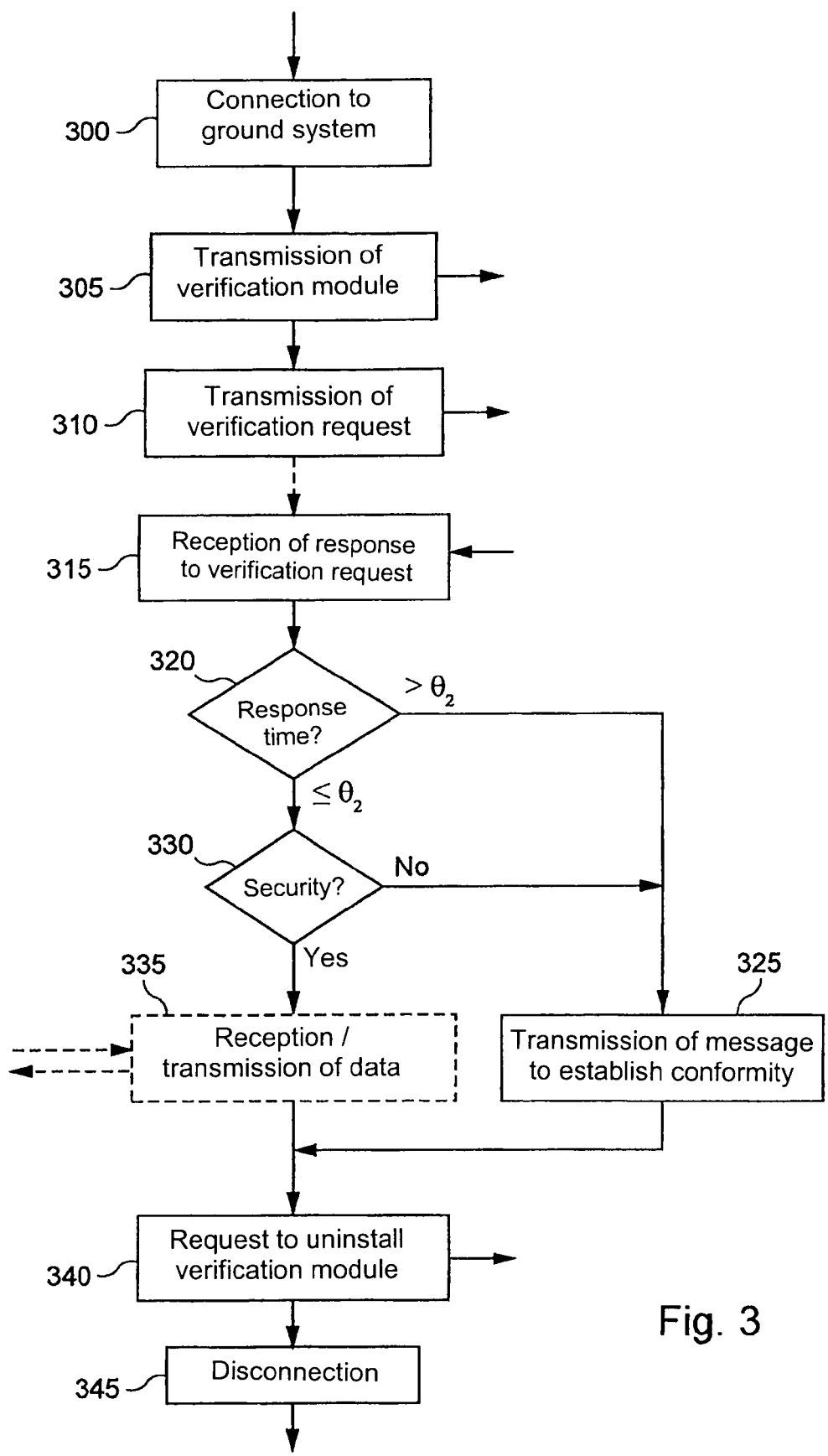
FIG. 3 illustrates some steps of a particular example of an algorithm employed in an aircraft, according to the invention.

FIG. 3 illustrates some steps of a particular example of an algorithm employed in an aircraft, according to the invention, in order to improve the reliability of communication between this aircraft and a ground system.

After having established a communication channel between this aircraft and a ground system by a standard mechanism (step 300), the aircraft transmits the application module that must be used to verify the security of the ground system (step 305). This application module is preferably an executable code independent of the operating system of the ground system. The application module is, for example, the semi-compiled Java code (Java is a trade name).

A verification request is then transmitted to the ground system (step 310). The aircraft then waits for the response to this request (as suggested by the dashed arrow).

After having received the response to the verification request (step 315), the aircraft determines the time elapsed between transmission of the request and reception of the response thereto. This time is compared with a predetermined threshold $\theta_2$ (step 320).

If the time elapsed between transmission of the request and reception of the response thereto is longer than the threshold $\theta_2$, a message to establish conformity is preferably sent to the ground system, advantageously to the administrator of this system, in order to demand that the ground system be brought into conformity with the requirements imposed by the aircraft (step 325).

On the other hand, if the time elapsed between transmission of the request and reception of the response thereto is shorter than or equal to the threshold $\theta_2$, the aircraft analyzes the response transmitted by the ground system (step 330).

It should be noted here that, as indicated in the foregoing, the time elapsed between transmission of the request and reception of the response thereto can be compared with a second predetermined threshold $\theta_1$. Thus, if the elapsed time is between the thresholds $\theta_1$ and $\theta_2$, transmission and/or reception of only certain types of data is or are authorized, while if the elapsed time is shorter than $\theta_1$, all types of data may be exchanged. Naturally, it is possible to use more than two thresholds.

Depending on the response received, the analysis thereof simply comprises determining the response (positive or negative) or comparing scores.

If a score is transmitted in the response, it may be compared with one or more predetermined thresholds stored in memory in the aircraft. Depending on the result of this comparison, the aircraft may decide to transmit and/or receive all types of data, to transmit or receive only certain types of data or to not transmit and receive any type of data.

If the aircraft decides not to transmit and receive any type of data, a message to establish conformity is preferably sent to the ground system (step 325).

On the other hand, if the aircraft decides to transmit and/or receive at least certain types of data, it is possible for data to be exchanged between the aircraft and the ground system (step 335), as suggested by the dashed arrows.

After a message to establish conformity has been transmitted or after data have been exchanged, a request to uninstall the verification application module is preferably transmitted to the ground system (step 340). It should be noted that this step may be executed as soon as the aircraft has received the response to the verification request.

The connection between the aircraft and the ground system is then broken (step 345).

Figure 4A:
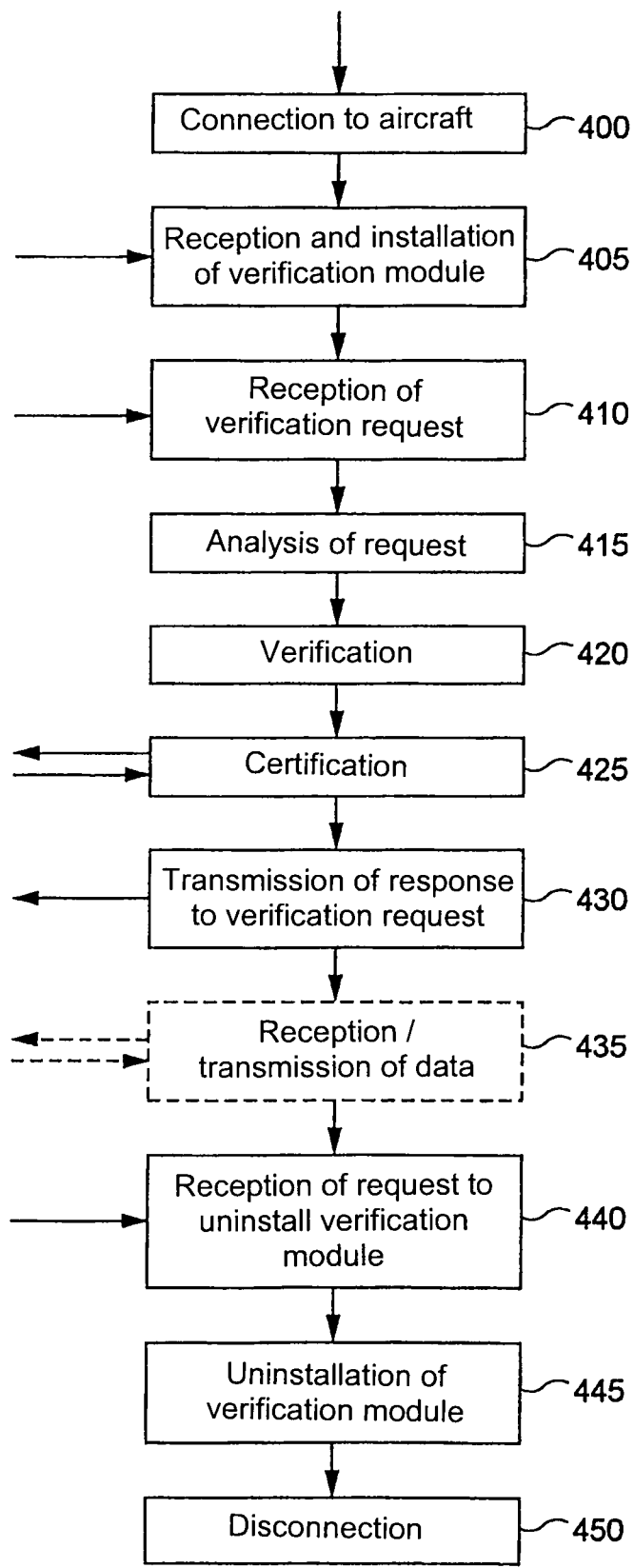
FIGS. 4a and 4b, illustrates some steps of two particular examples of algorithms employed in a ground system, according to the invention.
Figure 4B:
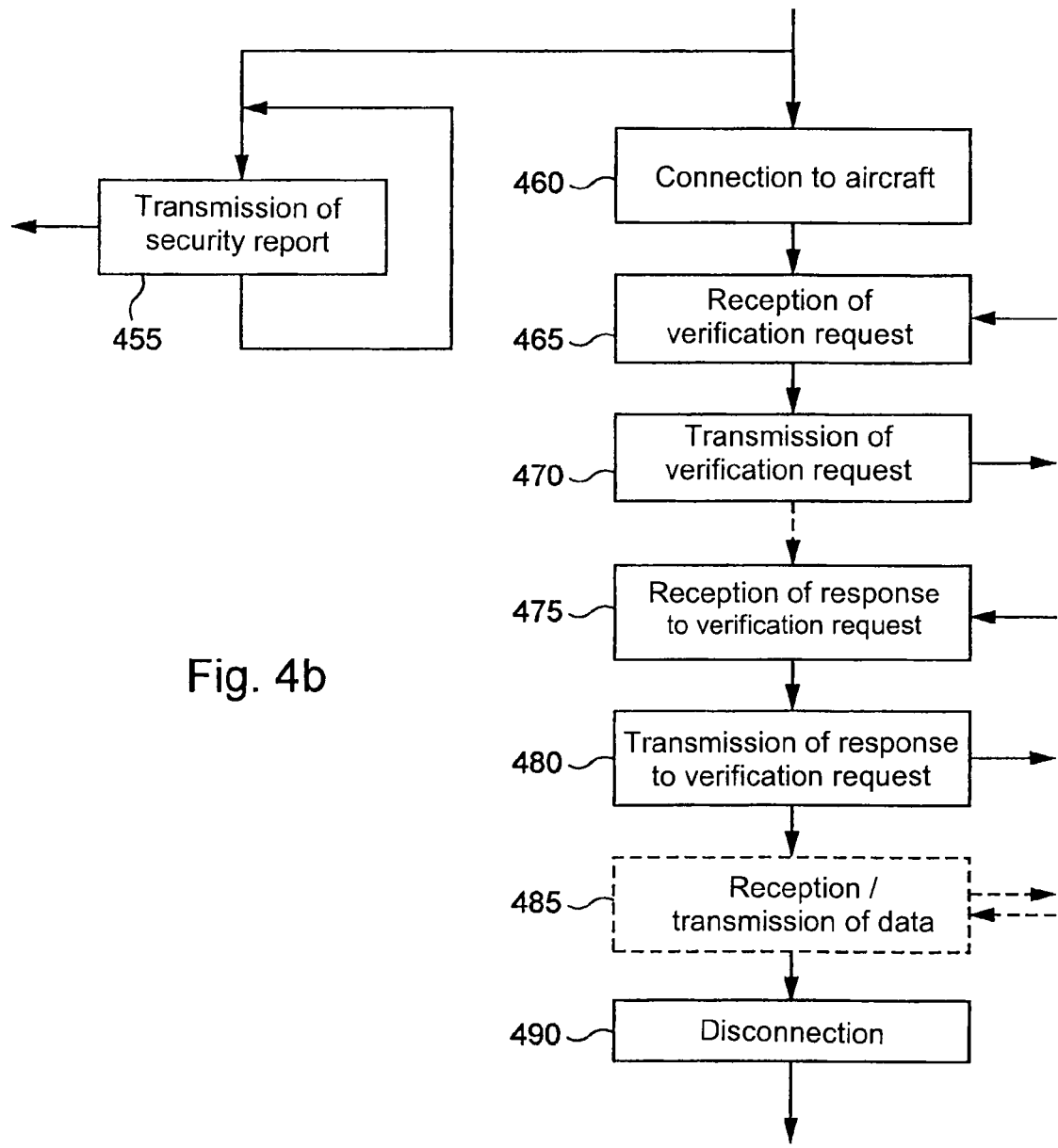

FIG. 4, comprising FIGS. 4a and 4b, illustrates some steps of two particular examples of an algorithm employed in a ground system, in a manner corresponding to the invention, in order to improve the reliability of communication between this aircraft and a ground system.

According to the first example, illustrated in FIG. 4a, the verification application module is temporarily downloaded to the ground system. After having established a communication channel between an aircraft and the ground system by a standard mechanism (step 400), the ground system receives from the aircraft a verification application module, which is then installed (step 405).

As explained in the foregoing, this module is advantageously an executable code independent of the operating system of the ground system. Preferably, therefore, it is directly executable. If necessary, a conversion step (not shown) is employed to convert the received application module into a module that is executable on the ground system.

When the ground system receives a verification request (step 410), the ground system analyzes the request (step 415) and executes the received verification application module (step 420). The verification is performed, if necessary, according to the parameters contained in the request.

If at least part of the verification must be certified by a trusted third party, a certification step is performed (step 425). Such a step consists, for example, in transmitting verification results obtained by the application module to the system of a trusted third party for comparison thereof with the verification results previously obtained thereby. If the results are identical, a certificate, preferably encrypted, is transmitted by the system of the trusted third party to the ground system for transmission to the aircraft.

The verification result is then transmitted, together with the certificate if necessary, to the aircraft (step 430).

Depending on this result, if the aircraft so decides, data may be exchanged between the aircraft and the ground system (step 435). As suggested by the dashed line, since the authorization permitting this data exchange is determined by the aircraft, the ground system acts as a client of the aircraft and accedes to its requests.

After the ground system has received from the aircraft a request for uninstallation of the verification application module (step 440), this module is uninstalled (step 445).

When the ground system has been verified and data have been exchanged if necessary, the connection between the aircraft and the ground system is broken (step 450).

According to the second example, illustrated in FIG. 4*b*, the verification application module is permanently downloaded to the ground system. This module comprises a function for regularly performing a verification of the ground system and transmitting a security report to the system of a trusted third party (step 455).

After having established a communication channel between an aircraft and the ground station by a standard mechanism (step 460), the ground system may receive a verification request from the aircraft (step 465).

This request is then transmitted to the system of the trusted third party (step 470) to permit the latter to evaluate the security of the ground system on the basis of previously received security reports. After this security has been evaluated, the system of the trusted third party transmits a response to the request to the ground station (step 475), which in turn transmits it to the aircraft (step 480).

Advantageously, the response received from the trusted third party is encrypted or digitally signed in such a way that the ground system cannot modify it, thus preventing a pirate who has gained control of the ground system from being able to modify the results of the evaluation of the security of the ground system.

As in the example described in the foregoing with reference to FIG. 4*a*, the aircraft decides as a function of the results received whether it authorizes exchange of data with the ground system (step 485). As suggested by the dashed line, since the authorization permitting this data exchange is determined by the aircraft, the ground system acts as a client of the aircraft and accedes to its requests.

When the ground system has been verified and data have been exchanged if necessary, the connection between the aircraft and the ground system is broken (step 490).

Figure 5:
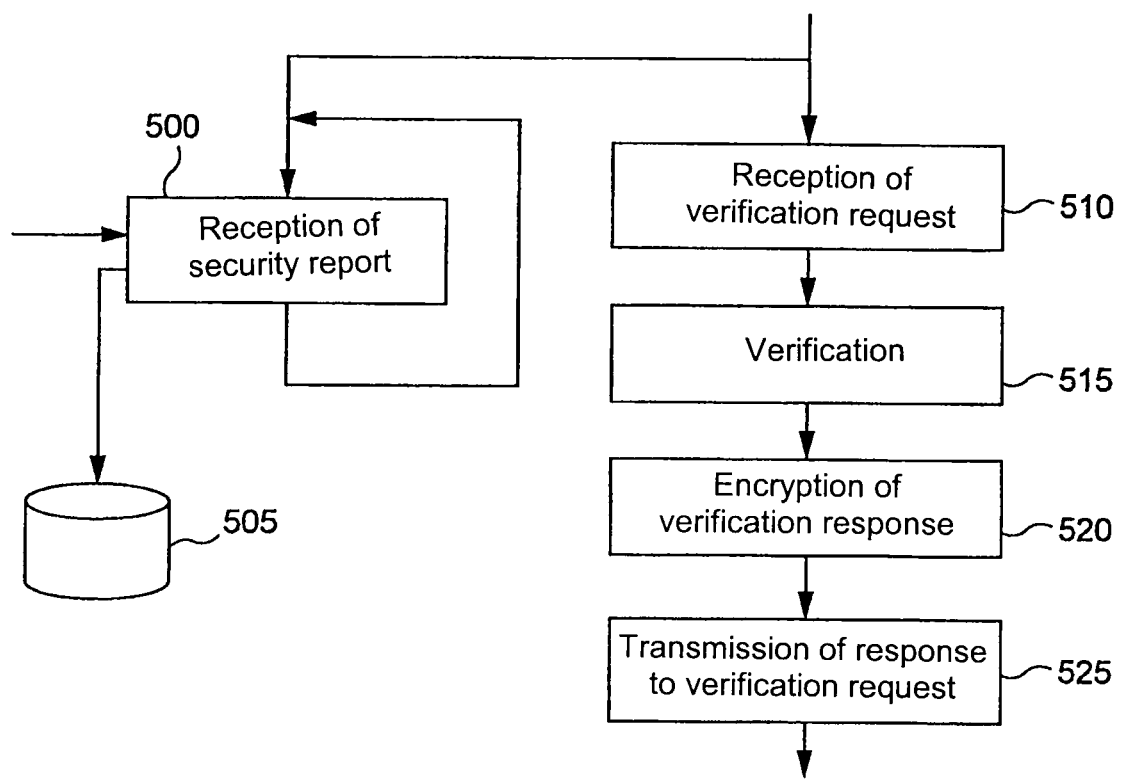
FIG. 5 illustrates some steps of a particular example of an algorithm employed in a system of a trusted third party, according to the invention.

FIG. 5 illustrates some steps of a particular example of an algorithm employed in a system of a trusted third party, according to the invention, in order to improve the reliability of communication between an aircraft and a ground system.

According to this example, a verification application module is permanently downloaded to the ground system. As described in the foregoing with reference to FIG. 4*b*, this application module comprises a function for regularly performing a verification of the ground system and transmitting a security report to the system of a trusted third party (step 500). These results on the security of the ground system are preferably stored in memory by the third-party system in a database 505.

After having received a verification request from the ground system (step 510), the system of the trusted third party verifies the security of the ground system (step 515). Such a verification is performed, if necessary, according to the parameters contained in the request. This verification may consist in particular of analyzing the security reports stored in memory in database 505.

The result of the request is then preferably encrypted or digitally signed by a standard mechanism (step 520), in such a way that the ground system is unable to falsify the results when they are transmitted to the aircraft then transmitted to the ground system (step 525).

Thus the system of the trusted third party has a view over a relatively long time period, permitting it to determine whether or not the remote system is secure.

According to a particular embodiment, if the aircraft does not receive a response from the trusted third party, it may decide to trust the resident program installed on the ground system provided that it communicates with the ground system in a degraded mode, or in other words a mode in which only certain types of data can be exchanged.

Advantageously, the system of the trusted third party comprises a surveillance application of the heartbeat type, according to which a periodic communication is established between the system of the trusted third party and the ground system, permitting the system of the trusted third party to be certain that the verification application module installed on the ground system is functioning properly. This surveillance application makes it possible to be certain that the verification application module has not been turned off or has not been restarted.

As indicated in the foregoing, the communication channels used by the aircraft and the ground system during the phase of verification of the ground system are preferably secure.

A solution consists in digitally signing the exchanged information items, to be certain that they originate from the aircraft, from the ground system or from a trusted third party, or in other words that they were not transmitted by a pirate who is usurping the identity of the aircraft, of the ground system or of the trusted third party.

A risk analysis may be necessary to determine which counter-measures are necessary to prevent the signature certificate from being stolen.

According to a first implementation, the verification application module uses off-line digital certificates in chip cards or in keys of the USB type (the initials for Universal Serial Bus in English terminology) adapted to protect a signature certificate.

It is also possible to integrate the digital certificate necessary for the signature in the verification application module itself. Mechanisms for protection against inverse engineering, known as reverse engineering in English terminology, may then protect the certificate stored in the module from potential extraction. Several solutions exist, especially the following solutions, obfuscation: the source code is transformed before compilation to make it incomprehensible for a human (for example, by complicating the code or performing lexical transformations);

instituting anti-debugging mechanisms (for example, by verifying the absence of a debugging application and anti-memory-dumping mechanisms in order to prevent a third party from recovering the information items contained in the random-access memory; and/or, compressing and encrypting the certificate itself.

In this way the verification application module can be considered as a black box, which makes it very difficult for a pirate to recover the signature certificate and more generally to understand the mode of functioning of the application module.

Figure 6:
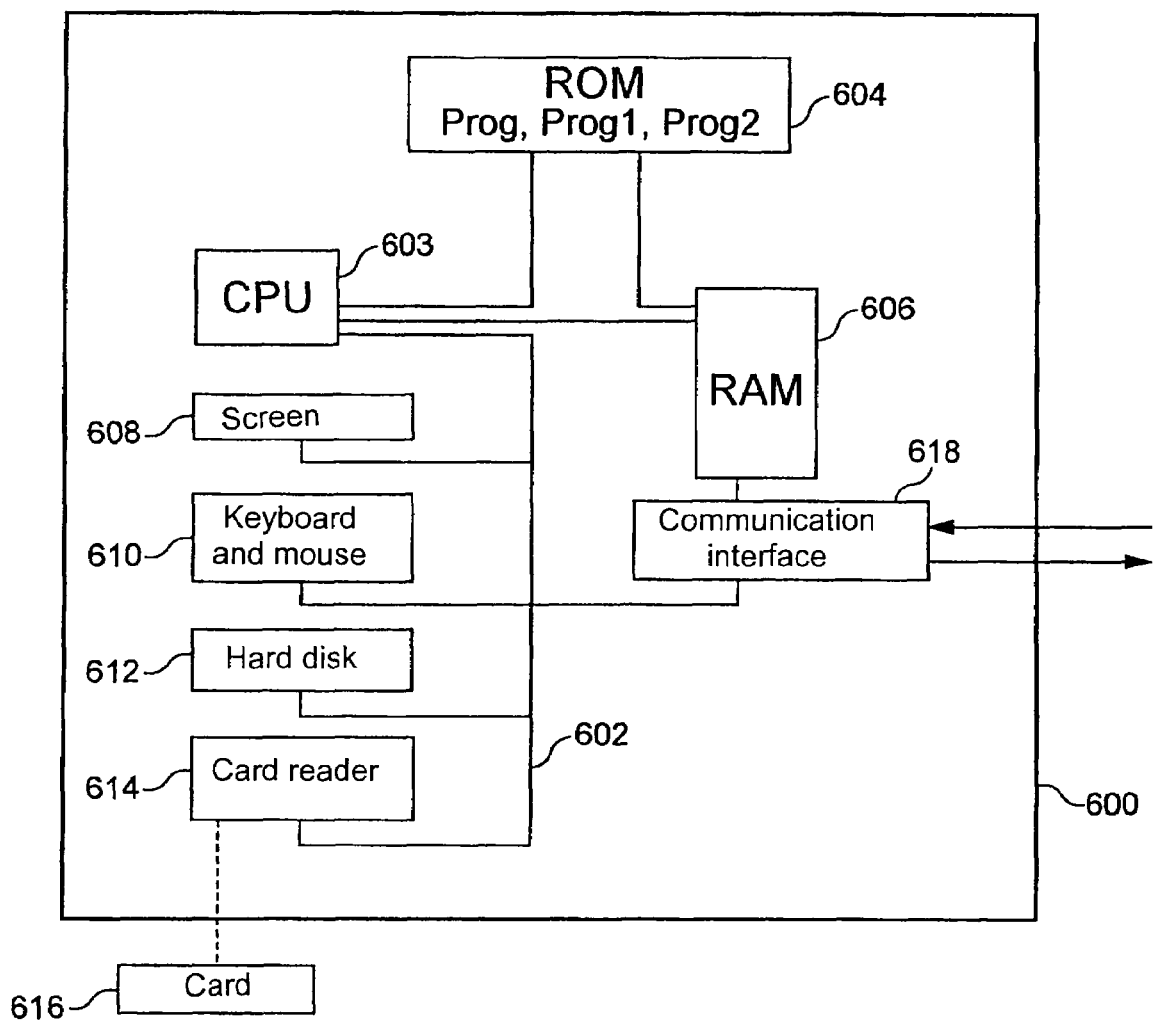
FIG. 6 illustrates an example of a device with which the invention can be implemented at least partly.

A device adapted for employment of the invention or part of the invention is illustrated in FIG. 6. Device 600 is, for example, a calculator, a microcomputer or a workstation.

In the present case, device 600 is provided with a communication bus 602, to which there are connected:

a central processing unit or microprocessor 603 (CPU, Central Processing Unit);

a permanent memory 604 (ROM, the acronym for Read Only Memory in English terminology), which may be provided with the programs "Prog", "Prog1" and "Prog2";

a volatile memory or cache memory 606 (RAM, the acronym for Random Access Memory in English terminology), provided with registers capable of recording variables and parameters created and modified in the course of execution of the aforesaid programs; and a communication interface 618, capable of transmitting and receiving data.

Optionally, device 600 may also be provided with:

a screen 608, for visualizing data and/or for acting as a graphical interface with the user who will be able to interact with the programs according to the invention, by means of a keyboard and of a mouse 610, or of another pointing device, a touch screen or a remote controller;

a hard disk 612, which can be loaded with the aforesaid programs "Prog", "Prog1" and "Prog2" and with processed data or data to be processed according to the invention; and a memory card reader 614 adapted to receive a memory card 616 and to read or write therein processed data or data to be processed according to the invention.

The communication bus permits communication and interoperability between the different elements included in device 600 or connected thereto. The representation of the bus is not limitative and, in particular, the central unit is capable of communicating instructions to any element of device 600 directly or via another element of device 600.

The executable code that in each program permits the programmable device to employ the processes according to the invention may be stored, for example, on hard disk 612 or in read-only memory 604.

According to one variant, memory card 616 may contain data, especially signature keys, as well as the executable code of the aforesaid programs, which code will be stored on hard disk 612 once it has been read by device 600.

According to another variant, it will be possible for the executable code of the programs to be received at least partly via interface 618 to be stored in a manner identical to that described in the foregoing.

More generally, it will be possible for the program or programs to be loaded into one of the storage means of device 600 before being executed.

Central unit 603 will command and direct the execution of the instructions or portions of software code of the program or programs according to the invention, which instructions are stored on hard disk 612 or in read-only memory 604 or else in the other aforesaid storage elements. During boot-up, the program or programs that is or are stored in a non-volatile memory, such as hard disk 612 or read-only memory 604, are transferred into random-access memory 606, which then contains the executable code of the program or programs according to the invention as well as registers for storing in memory the variables and parameters necessary for employment of the invention.

It should be noted that the communication apparatus containing the device according to the invention may also be a programmed apparatus. This apparatus then contains the code of the computer program or programs resident, for example, in an application-specific integrated circuit (ASIC).

Although the foregoing description is essentially oriented toward exchange of data between an aircraft and a ground system, it should be noted here that the invention is also suitable for improving the reliability of communications among a plurality of aircraft.

Naturally, to satisfy specific needs, a person skilled in the art of the invention will be able to apply modifications in the foregoing description.

The invention claimed is:

1. A method for an aircraft for improving the reliability of data communication between the aircraft and a remote system, the method comprising the following steps:

transmitting, from the aircraft to the remote system, a request for verification of a security of the remote system, the request including an application module installed and executed by the remote system to analyze the security of the remote system;

receiving, in response to transmitting the request, at least one indication pertaining to the security of the remote system;

analyzing the indication; and in response to the analyzing, establishing or not establishing the data communication between the aircraft and the remote system.

2. A method for a remote system for improving reliability of data communication between an aircraft and the remote system, the method comprising:

receiving, from the aircraft at the remote system, a request for verification of a security of the remote system, the request including an application module to analyze the security of the remote system;

verifying the security of the remote system by installing and executing the application module;

transmitting a response to the request, the response including at least one indication pertaining to the verifying; and permitting establishment of data communication between the aircraft and the remote system as a function of analysis of the at least one indication included in the response.

3. The method according to claim 2, wherein the verification request is transmitted to a third-party system, wherein the verifying is performed at least partly by the third-party system.

4. The method according to claim 3, wherein the response is at least partly received from the third-party system, a part of the response received from the third-party system being at least partly encrypted by the third-party system.

5. The method according to claim 2, wherein the at least one indication represents a level of security of the remote system.

6. The method according to claim 2, wherein the verification request comprises at least one reference to an instruction whereby at least one element of security of the remote system can be verified.

7. The method according to claim 2, wherein the verification request comprises an indication pertaining to a required level of security of the remote system.

8. The method according to claim 2, further comprising:

receiving, after transmitting the response including the at least one indication, a request from the aircraft to uninstall the application module; and uninstalling the application module from the remote system.

9. The method according to claim 2, wherein the remote system is a ground-based remote system.

10. The method according to claim 1, wherein the at least one indication represents a level of security of the remote system.

11. The method according to claim 1, wherein the verification request comprises at least one reference to an instruction whereby at least one element of security of the remote system can be verified.

12. The method according to claim 1, wherein the verification request comprises an indication pertaining to a required level of security of the remote system.

13. The method according to claim 1, further comprising:
   transmitting, after receiving the at least one indication, a request to the remote system to uninstall the application module.

14. The method according to claim 1, wherein the remote system is a ground-based remote system.

15. An aircraft comprising:
   means for transmitting, to a remote system, a request for verification of a security of the remote system, the request including an application module installed and executed by the remote system to analyze the security of the remote system;
   means for receiving, in response to transmitting the request, at least one indication pertaining to the security of the remote system;
   means for analyzing the indication; and
   means for, in response to the analyzing, establishing or not establishing the data communication between the aircraft and the remote system.

16. The aircraft according to claim 15, wherein the remote system is a ground-based remote system.

\* \* \* \* \*